United States Patent [19]
Adams

[11] 3,967,186
[45] June 29, 1976

[54] SOLID STATE VOLTAGE REGULATOR

[75] Inventor: Guy Adams, Monroe, N.Y.

[73] Assignee: Solitron Devices, Inc., Tappan, N.Y.

[22] Filed: Feb. 3, 1975

[21] Appl. No.: 546,550

[52] U.S. Cl. .................................. 322/28; 320/35; 323/22 T
[51] Int. Cl.² ......................................... H02J 7/14
[58] Field of Search .................. 320/61, 64, 68, 32, 320/35, 36; 322/28; 323/22 T

[56] References Cited
UNITED STATES PATENTS

| | | |
|---|---|---|
| 3,373,333 | 3/1968 | Eckard.................................. 320/32 |
| 3,538,421 | 11/1970 | Young .................................. 322/28 |
| 3,553,565 | 1/1971 | Ebbinge et al. ....................... 320/64 |
| 3,596,115 | 7/1971 | Conzelmann...................... 323/22 T |
| 3,781,633 | 12/1973 | Iwaki et al. ........................ 322/28 X |

Primary Examiner—J D Miller
Assistant Examiner—Robert J. Hickey
Attorney, Agent, or Firm—Richard G. Geib

[57] ABSTRACT

A solid state voltage regulator for an alternator charging system having a zener diode controlled transistor operatively connected to a integrated Darlington chip.

1 Claim, 1 Drawing Figure

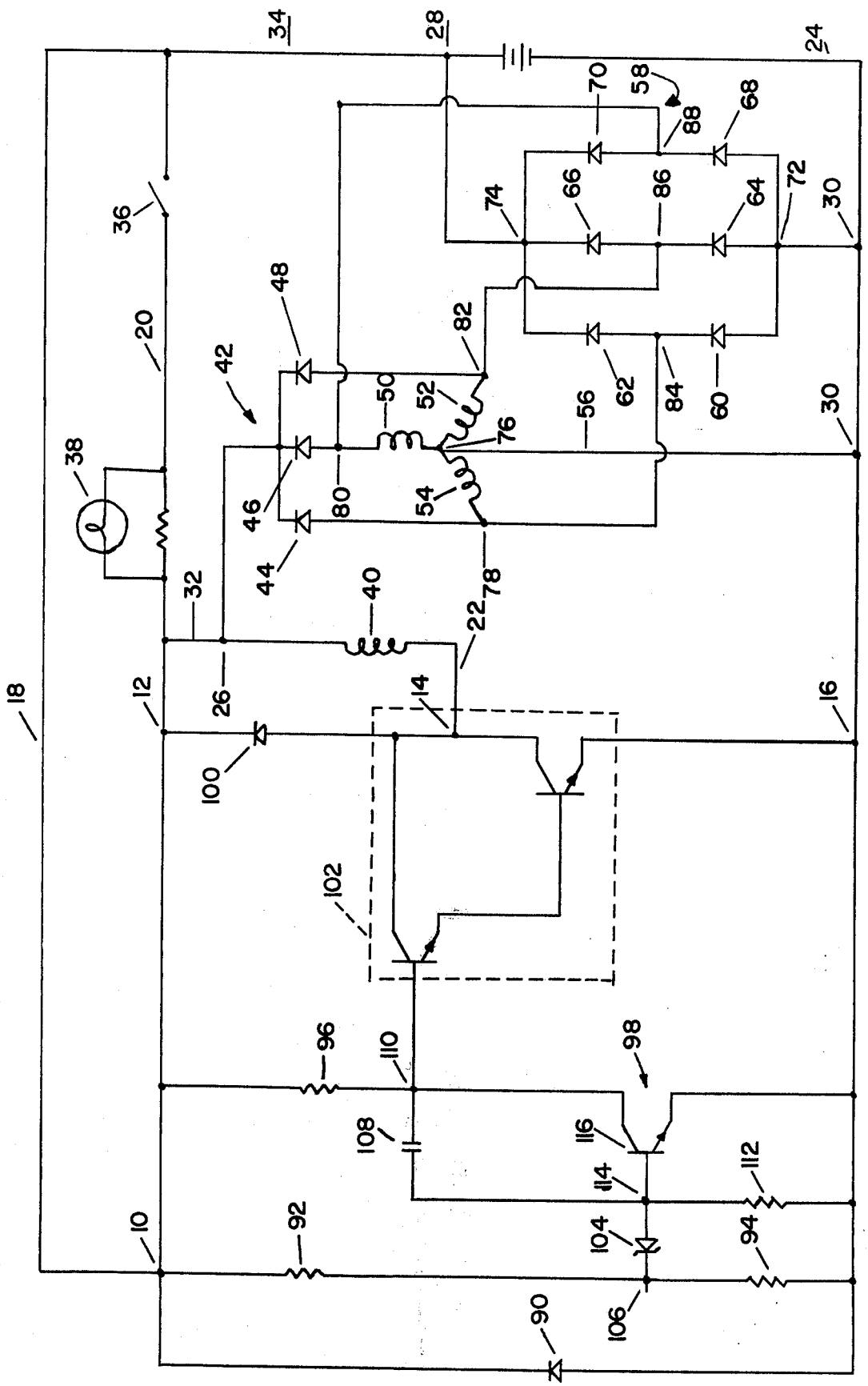

SOLID STATE VOLTAGE REGULATOR

BACKGROUND

Every automobile has its own self controlled electrical system. In todays vehicles the heart of the system is in regulating or controlling the electrical output of an alternator to prevent too much power from damaging portions of the electrical system.

Some regulators are available that make use of the capabilities of semiconductors. In particular, it has been the intent of prior art devices to couple transistors and diodes in order to sense voltage at a regulator terminal of an alternator to supply the necessary power for maintaining the vehicle's electrical system at the output terminal, as determined by the electrical load on the system.

In these devices whenever system voltage above a predetermined level is impressed on the diode means it will be conductive to switch transistor means to stop current supplied to the alternator. When the system voltage drops below the predetermined level the diode means stop conducting to switch the transistor means to open supply of current to the alternator.

It is in the improvement of these systems that this invention has been conceived.

More particularly, it is the principle object of this invention to provide a solid state regulator which has a minimum of components and a minimum of connections so as to economize on production and enhance reliability.

It is a further object of this invention to provide a solid state voltage regulator which employs integrated circuit technology in obtaining the aforesaid object which also improves on the prior art by enhancing gain in control of battery charging and allows for temperature tracking.

It is still a further object of this invention to provide in voltage regulators a switching semiconductive means whereby positive quick acting control of a charging circuit is obtained.

A still further object of this invention is to provide protection by semiconductive means of the solid state voltage regulator as to reverse transients in an electrical system caused by other electrical apparatus.

DRAWING DESCRIPTION

In regard to the drawing there is shown a schematic form of a battery circuit for a voltage regulator and alternator charging system.

As can be seen there are four terminals 10, 12, 14 and 16 for the voltage regulator connection to a battery lead 18, an ignition switch lead 20, an alternator lead 22 and a ground lead 24. Also, there are three terminals 26, 28 and 30 for the alternator connection switch lead 20 via a short lead connection 32, a battery lead 34 to which lead 18 is connected in the embodiment shown, and to the ground lead 24. The ignition lead 20 had interposed an ignition switch 36 and a charge, no-charge indicator 38 in the form of a light in the preferred form shown.

By way of description the alternator is comprised of a rotor coil 40 connected between lead 22 and lead connection 32, a diode bridge circuit 42 comprising diodes 44, 46, and 48 connecting terminal 26 to stator coils 50, 52 and 54 connected also by lead connection 56 to terminal 30, and, a diode control system 58 having three pairs of dioes 60, 62; 64, 66; and 68, 70 having a common ground terminal 72 and a common battery terminal 74 for terminals 28 and 30, respectively, of the alternator. Each stator coil has, in addition to a common connection, as at 76, to ground terminal 30, shown in two parts for drawing clarity, three other connections 78, 80 and 82 connected to connections 84, 86 and 88 between diodes 60, 62; 64, 66; and 68, 70, respectively to complete the alternator circuit shown.

As for the voltage regulator portion of the circuit shown it is constructed with a diode 90 between terminals 12 and 16 to provide reverse transient protection to the voltage regulator from other elements (not shown) of the electrical circuit connected to the battery. Also between the terminals 12 and 16 reading from left to right on the drawing are: (1) resistors 92 and 94, (2) resistor 96 and transistor 98, and (3) diode 100 and Darlington transistor chip 102. The voltage regulator circuit is completed by connecting a zener 104 to a lead connection 106 between resistors 92 and 94, and to a capacitor 108 connected to a lead connection 110 between resistor 96 and transistor 98 and to a resistor 112 between connection 114 and terminal 16, which connection 114 is connected to base 116 of transistor 98.

It should be understood that the battery lead 18 can be connected to be conductive of a reference battery voltage upon closure of the ignition switch 36 rather than directly to the battery, as shown. In all cases it has been found that the aforesaid voltage regulator circuit provides with far fewer elements the requisite switching of the alternator in charging the battery.

In operation, when the ignition switch 36 is closed a voltage is provided to rotor 40 of the alternator. In that there is at this time no voltage produced in the stator coils 50, 52 or 54 passing by way of diode bridge 42 the indicator 38 will have its circuit completed via rotor 40, lead 22, terminal 14 and Darlington chip 102 to terminal 16 and ground lead 24. Therefore, the bulb of indicator 38 will be illuminated to show the alternator is not charging the battery.

As will be readily appreciated the alternator is driven by an engine after the engine is started by further operation of the ignition switch 36 so that the stator windings develop a voltage for diode bridge 42 and diode control system 58. However, before going into this further it is best that one understand the initial state of circuit aforementioned.

The key to the conductance of the Darlington chip upon closure of the ignition switch 36 is the transistor 98. As can be seen in the drawing, transistor 98 is arranged to be non-conductive until the current flow via battery connection 10 and measuring circuit of resistors 92 and 94 is sufficient to develop a voltage to operate zener diode 104. At this point a voltage will be provided at base 116 whereby current will flow via resistor 96 and transistor 98 to terminal 16. It should also be noted that the resistor 112 serves to keep base 116 near ground potential for DC stability, and capacitor 108 is used in the Miller efect mode (negative feedback) to provide high frequency stability. Whenever current flows via transistor 98 it is removed from biasing Darlington chip 102 on whereby rotor coil 40 is connected via diode 100 to terminal 12.

Diode 100 is a free wheeling diode, as the term is used in the industry, to provide a return path for the decay in the field of rotor coil 40.

In any event and returning to the case of the operation of the alternator, as soon as the rotor is driven, the stator connections 78, 80 and 82 are provided with a voltage that is, when of sufficient order, passed via diodes 44, 46 and 48 to connection 26. This will buck the current flow and extinguish indicator 38. At the same time the voltage is developed at connections 84, 86 and 88 which, if of sufficient order, is provided by diodes 62, 66 and 70 through common connection 74 to battery connection 28.

It will then be appreciated that a voltage potential will be available via lead 18 to the measuring circuit resistors 92 and 94 for operation of zener diode 104 when sufficient to control the rotor field current and thereby the amount of charging voltage for the battery.

A very important consideration in the construction of the voltage regulator is to select the base emitter diode operating point of each semiconductor so as to obtain temperature compensation. For example, if one were to use the voltage regulator in an environment having a temperature range between −35°C and 110°C it would be necessary to charge the battery at a higher voltage potential at the lower temperature to get some current flow. For example, charging a batter at −35°C would require more voltage than at 100°C. Therefore, the correct charging slope as a function of temperature would be volts per °C or the total temperature excursion divided by the volts per °C required. In practice the zener diode 104 and the transistor 98 were chosen such the base emitter diode operating point of the zener has a negative temperature coefficient typically 0.009 volts per °C which with the selected positive temperature coefficient typically 0.004 volts per °C of transistor 98 provides a total compensating network. The use of the single chip construction for the Darlington transistor 102 provides a consistant base emitter diode operating point (using silicon, 0.004 volts per °C) thereby eliminating a mismatching of these transistors in the system as aforesaid in that the negative operating point balance to the Darlington chip will be compensated thereby.

Having now described a form of construction and operating of this invention it is now desired to set forth the scope by the appended claim.

What is claimed is:

1. A solid state voltage regulator comprising in combination:
   source input and output terminals;
   a charging means terminal;
   a measuring circuit of series connected resistances between said source input and output terminals;
   a first transistor between said source input and output terminals, said first transistor having a base emitter diode point providing a positive temperature coefficient;
   a resistor circuit between a base of said first transistor and the said source output terminal to provide source stability for said first transistor;
   a Miller effect circuit between said source input terminal and said base of said first transistor to provide high frequency stability;
   a second transistor means including two transistors in a Darlington circuit in a single chip of semiconductor material to avoid mismatching of base emitter diode operating points of discrete transistors while providing consistancy with said first transistor, said second transistor means being between said source input and output terminals and being operatively connected to said first transistor, said second transistor means having its common collector output connected to said charging means terminal;
   a diode means between said charging means terminal and said input terminal to provide a return path for decay in field from said charging means terminal;
   a voltage reference zener diode connected between said first transistor and said measuring circuit between said series connected resistances, said zener diode having a base emitter diode point such as to provide a negative temperature coefficient to in combination with said first transistor positive temperature coefficient and the consistant base emitter diode operating point of said second transistor means provide a means to predetermine temperature compensation and provide the required voltage per °C for any known temperature excursion; and
   a diode connected between said source output terminal and said source input terminal to provide reverse transient protection for said voltage regulator.

* * * * *